United States Patent
Bauder et al.

(10) Patent No.: US 7,889,658 B1
(45) Date of Patent: Feb. 15, 2011

(54) METHOD OF AND SYSTEM FOR TRANSFERRING OVERHEAD DATA OVER A SERIAL INTERFACE

(75) Inventors: James R. Bauder, Chatsworth, CA (US); Khoi D. Vu, South Jordan, UT (US); Kevin S. Fatherree, Northridge, CA (US); Siddharth Khattar, Thousand Oaks, CA (US); Erik R. Swenson, San Jose, CA (US); Kathleen E. Cimino, Westlake Village, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1062 days.

(21) Appl. No.: 11/096,210

(22) Filed: Mar. 30, 2005

(51) Int. Cl.
*G08C 15/00* (2006.01)

(52) U.S. Cl. .............. 370/236; 370/366; 370/384; 370/390; 370/535; 710/71; 709/250

(58) Field of Classification Search .......... 370/360, 370/395.1, 388, 412, 235, 377, 229, 231, 370/236, 438, 336, 536, 235.1, 236.1, 366, 370/384, 389, 390, 432, 473, 535, 542; 709/232, 709/250, 227; 710/71, 62, 65
See application file for complete search history.

(56) References Cited

U.S. PATENT DOCUMENTS

| | | | | |
|---|---|---|---|---|
| 5,539,732 A | * | 7/1996 | Schyman et al. | 370/377 |
| 6,618,383 B1 | * | 9/2003 | Tomlins | 710/71 |
| 6,628,679 B1 | * | 9/2003 | Talarek | 370/536 |
| 7,023,841 B2 | * | 4/2006 | Dell et al. | 370/388 |
| 2001/0038620 A1 | * | 11/2001 | Stanwood et al. | 370/336 |
| 2002/0146023 A1 | * | 10/2002 | Myers | 370/412 |
| 2003/0076832 A1 | * | 4/2003 | Ni | 370/395.1 |
| 2003/0110303 A1 | * | 6/2003 | Chen et al. | 709/250 |
| 2003/0117958 A1 | * | 6/2003 | Nation et al. | 370/235 |
| 2004/0003094 A1 | * | 1/2004 | See | 709/227 |
| 2004/0100900 A1 | * | 5/2004 | Lines et al. | 370/229 |
| 2005/0005021 A1 | * | 1/2005 | Grant et al. | 709/232 |
| 2006/0146808 A1 | * | 7/2006 | Campini et al. | 370/360 |

OTHER PUBLICATIONS

Cummings, "PivotPoint: clockless crossbar switch for high-performance embedded systems" Micro, IEEE vol. 24, Issue 2, Mar.-Apr. 2004 pp. 48-59.*

* cited by examiner

*Primary Examiner*—Kwang B Yao
*Assistant Examiner*—Jeffrey M Rutkowski
(74) *Attorney, Agent, or Firm*—Blakely Sokoloff Taylor & Zafman LLP

(57) ABSTRACT

A method of and system for transferring overhead data from a sender to a receiver over a serial interface is provided. The overhead data is transferred over one or more data lines of the interface during one or more time periods in which excess bandwidth is available on the one or more data lines or while the transfer of the overhead data does not substantially impede the throughput of the payload transfer.

28 Claims, 21 Drawing Sheets

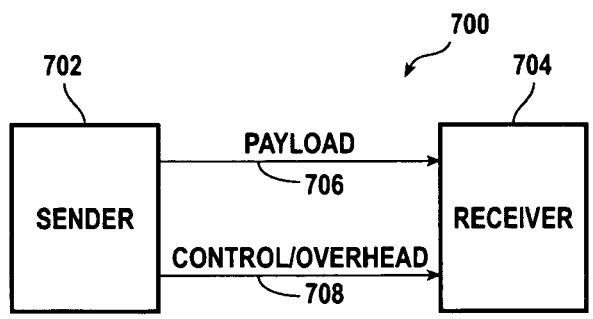
FIG. 7
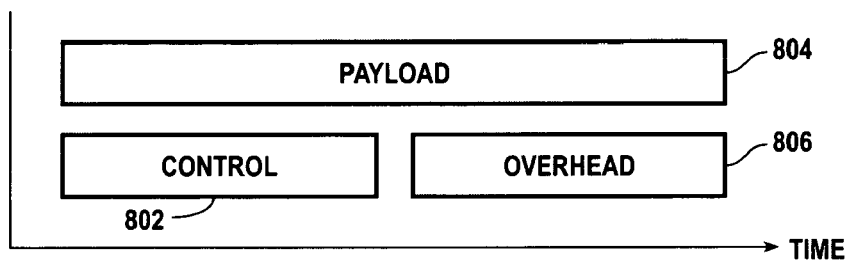
FIG. 8
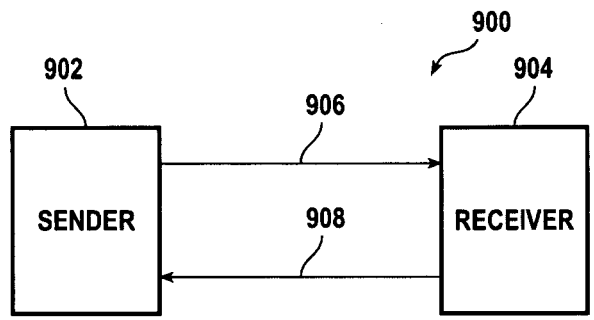
FIG. 9
| STARVING | 00 |
| --- | --- |
| HUNGRY | 01 |
| SATISFIED | 10 |
| FULL | 11 |
FIG. 10

| Port0 Status | Port1 Status | Port2 Status | Port3 Status | Port4 Status | Port5 Status | Port6 Status | Port7 Status | Port8 Status | Port9 Status |
|---|---|---|---|---|---|---|---|---|---|
| 2b | 2b | 2b | 2b | 2b | 2b | 2b | 2b | 2b | 2b |

FIGURE 18

| PoolStat[1] | PoolStat[0] | Description |
|---|---|---|
| 0 | 0 | STARVING<br><br>The STARVING status indicates the FIFO of the corresponding sink pool is almost empty. When a STARVING status is received, the amount of credits at the source pool is set to the MaxBurst level. |
| 0 | 1 | HUNGRY<br><br>The HUNGRY status indicates that the FIFO of the corresponding sink pool is partially empty. When a HUNGRY status is received, the amount of credits at the source pool is increased to MidBurst level, if the current level is less than the MidBurst level. If the amount of credits remaining is greater than the MidBurst level, the credit count is left unchanged. |
| 1 | 0 | SATISFIED<br><br>The SATISFIED status indicates that the FIFO of the corresponding sink pool is almost full. When the SATISFIED status is received, no further credits are granted. Credits previously granted remain available. |
| 1 | 1 | FULL<br><br>The FULL status indicates that the corresponding sink pool is full. When the FULL status is received, all previously granted credits are cancelled. |

FIGURE 19

| Register Parameter | Definition | Parameter Type |
|---|---|---|
| MaxBurst | Number of credits, in 64-byte blocks, granted when the pool status message indicates STARVING | Bus |
| MidBurst | Number of credits, in 64-byte blocks, granted when the pool status message indicates HUNGRY | Bus |

FIGURE 20

| Ctrl | SOB | $C_1$ | $C_2$ | $C_3$ | $C_4$ | $C_5$ | $C_6$ | $C_7$ | $C_8$ | ... | = | SOB | $C_1$ |
|---|---|---|---|---|---|---|---|---|---|---|---|---|---|
| Lane0 | $D_1$ | $D_5$ | $D_9$ | $D_{13}$ | $D_{17}$ | $D_{21}$ | $D_{25}$ | $D_{29}$ | $D_{33}$ | ... | $D_{61}$ | $D_{65}$ | $D_{69}$ |
| Lane1 | $D_2$ | $D_6$ | $D_{10}$ | $D_{14}$ | $D_{18}$ | $D_{22}$ | $D_{26}$ | $D_{30}$ | $D_{34}$ | ... | $D_{62}$ | $D_{66}$ | $D_{70}$ |
| Lane2 | $D_3$ | $D_7$ | $D_{11}$ | $D_{15}$ | $D_{19}$ | $D_{23}$ | $D_{27}$ | $D_{31}$ | $D_{35}$ | ... | $D_{63}$ | $D_{67}$ | $D_{71}$ |
| Lane3 | $D_4$ | $D_8$ | $D_{12}$ | $D_{16}$ | $D_{20}$ | $D_{24}$ | $D_{28}$ | $D_{32}$ | $D_{36}$ | ... | $D_{64}$ | $D_{68}$ | $D_{72}$ |

FIGURE 21

Control Byte 0:

| Bit(s) | Description |
|---|---|
| 7:0 | Start of Burst Control Character (special 8b/10b code): |

Control Byte 1:

| Bit(s) | Description |
|---|---|
| 7 | PORT[4]: Supports up to 32 channels |
| 6:0 | Burst length[6:0]: number of bytes in the burst |

Control Byte 2:

| Bit(s) | Description |
|---|---|
| 7:4 | PORT[3:0]: Supports up to 64 channels |
| 3:0 | DIP-4: Data integrity code covering Burst length and port |

Control Byte 3:

| Bit(s) | Description |
|---|---|
| 7:6 | MIRROR[1:0]: VLAN bits from PBUS3 |
| 5:0 | EMARK[5:0]: Egress Mark bits |

FIGURE 22A

| 22A |
|---|
| 22B |
| 22C |

Control Byte 4:

| Bit(s) | Description |
|---|---|
| 7:4 | QNUM[3:0]: Queue number |
| 3:2 | EOP bits from PBUS3. |
| 1 | Reserved |
| 0 | SOP- start of packet burst. |

Control Byte 5:

| Bit(s) | Description |
|---|---|
| 7:6 | VLAN[1:0] from DID bits 9:8 |
| 5 | Reserved |
| 4:0 | Ingress Port, from RXCTRL of pbus |

Control Byte 6:

| Bit(s) | Description |
|---|---|
| 7:6 | FLOW CONTROL Port9 Status.<br>2'b00: STARVING<br>2'b01: HUNGRY<br>2'b10: SATISFIED<br>2'b11: FULL |
| 5:4 | FLOW CONTROL Port8 Status.<br>2'b00: STARVING<br>2'b01: HUNGRY<br>2'b10: SATISFIED<br>2'b11: FULL |
| 3:2 | FLOW CONTROL Port7 Status.<br>2'b00: STARVING<br>2'b01: HUNGRY<br>2'b10: SATISFIED<br>2'b11: FULL |
| 1:00 | FLOW CONTROL Port6 Status.<br>2'b00: STARVING<br>2'b01: HUNGRY<br>2'b10: SATISFIED<br>2'b11: FULL |

| 22A |
|---|
| 22B |
| 22C |

FIGURE 22B

Control Byte 7

| Bit(s) | Description |
|---|---|
| 7:6 | FLOW CONTROL Port5 Status.<br>2'b00: STARVING<br>2'b01: HUNGRY<br>2'b10: SATISFIED<br>2'b11: FULL |
| 5:4 | FLOW CONTROL Port4 Status.<br>2'b00: STARVING<br>2'b01: HUNGRY<br>2'b10: SATISFIED<br>2'b11: FULL |
| 3:2 | FLOW CONTROL Port3 Status.<br>2'b00: STARVING<br>2'b01: HUNGRY<br>2'b10: SATISFIED<br>2'b11: FULL |
| 1:0 | FLOW CONTROL Port2 Status.<br>2'b00: STARVING<br>2'b01: HUNGRY<br>2'b10: SATISFIED<br>2'b11: FULL |

Control Byte 8

| Bit(s) | Description |
|---|---|
| 7:6 | FLOW CONTROL Port1 Status.<br>2'b00: STARVING<br>2'b01: HUNGRY<br>2'b10: SATISFIED<br>2'b11: FULL |
| 5:4 | FLOW CONTROL Port0 Status.<br>2'b00: STARVING<br>2'b01: HUNGRY<br>2'b10: SATISFIED<br>2'b11: FULL |
| 3:0 | DIP-4: Data integrity code covering all Flow control bits, VLAN, EMARK and Qnum |

FIGURE 22C

| Ctrl | 1 | 2 | 3 | 4 | 5 | 6 | 7 | ... | 31 | 32 | | |
|---|---|---|---|---|---|---|---|---|---|---|---|---|
| | SOF | C₁ | C₂ | C₃ | | | | | | SOF | C₁ | C₁... |
| Lane0 | = | = | = | = | = | = | = | ... | = | = | = | = |
| Lane1 | = | = | = | = | = | = | = | ... | = | = | = | = |
| Lane2 | = | = | = | = | = | = | = | ... | = | = | = | = |
| Lane3 | = | = | = | = | = | = | = | ... | = | = | = | = |

FIGURE 23

Control Byte 0:

| Bit(s) | Description |
|---|---|
| 7:0 | Start of Flow Control Message Character (special 8b/10b code) |

Control Byte 1:

| Bit(s) | Description |
|---|---|
| 7:6 | FLOW CONTROL Port9 Status.<br>2'b00: STARVING<br>2'b01: HUNGRY<br>2'b10: SATISFIED<br>2'b11: FULL |
| 5:4 | FLOW CONTROL Port8 Status.<br>2'b00: STARVING<br>2'b01: HUNGRY<br>2'b10: SATISFIED<br>2'b11: FULL |
| 3:2 | FLOW CONTROL Port7 Status.<br>2'b00: STARVING<br>2'b01: HUNGRY<br>2'b10: SATISFIED<br>2'b11: FULL |
| 1:0 | FLOW CONTROL Port6 Status.<br>2'b00: STARVING<br>2'b01: HUNGRY<br>2'b10: SATISFIED<br>2'b11: FULL |

FIGURE 24A

| 24A |
|---|
| 24B |

Control Byte 2:

| Bit(s) | Description |
|---|---|
| 7:6 | FLOW CONTROL Port5 Status.<br>2'b00: STARVING<br>2'b01: HUNGRY<br>2'b10: SATISFIED<br>2'b11: FULL |
| 5:4 | FLOW CONTROL Port4 Status.<br>2'b00: STARVING<br>2'b01: HUNGRY<br>2'b10: SATISFIED<br>2'b11: FULL |
| 3:2 | FLOW CONTROL Port3 Status.<br>2'b00: STARVING<br>2'b01: HUNGRY<br>2'b10: SATISFIED<br>2'b11: FULL |
| 1:0 | FLOW CONTROL Port2 Status.<br>2'b00: STARVING<br>2'b01: HUNGRY<br>2'b10: SATISFIED<br>2'b11: FULL |

Control Byte 3:

| Bit(s) | Description |
|---|---|
| 7:6 | FLOW CONTROL Port1 Status.<br>2'b00: STARVING<br>2'b01: HUNGRY<br>2'b10: SATISFIED<br>2'b11: FULL |
| 5:4 | FLOW CONTROL Port0 Status.<br>2'b00: STARVING<br>2'b01: HUNGRY<br>2'b10: SATISFIED<br>2'b11: FULL |
| 3:0 | DIP-4: Data integrity code covering all Flow control bits |

FIGURE 24B

| 24A |
|---|
| 24B |

Burst 1

| Ctrl | C0 | C1 | C2 | C3 | C4 | C5 | C6 | C7 | C8 | SOM | M1 | ... | M7 |
|---|---|---|---|---|---|---|---|---|---|---|---|---|---|
| Lane0 | $D_1$ | $D_5$ | $D_9$ | $D_{13}$ | $D_{17}$ | $D_{21}$ | $D_{25}$ | $D_{29}$ | $D_{33}$ | $D_{37}$ | $D_{37}$ | ... | $D_{61}$ |
| Lane1 | $D_2$ | $D_6$ | $D_{10}$ | $D_{14}$ | $D_{18}$ | $D_{22}$ | $D_{26}$ | $D_{30}$ | $D_{34}$ | $D_{38}$ | $D_{38}$ | ... | $D_{62}$ |
| Lane2 | $D_3$ | $D_7$ | $D_{11}$ | $D_{15}$ | $D_{19}$ | $D_{23}$ | $D_{27}$ | $D_{31}$ | $D_{35}$ | $D_{39}$ | $D_{39}$ | ... | $D_{63}$ |
| Lane3 | $D_4$ | $D_8$ | $D_{12}$ | $D_{16}$ | $D_{20}$ | $D_{24}$ | $D_{28}$ | $D_{32}$ | $D_{36}$ | $D_{40}$ | $D_{40}$ | ... | $D_{64}$ |

Burst 2

| Ctrl | C0 | C1 | C2 | C3 | C4 | C5 | C6 | C7 | C8 | M8 | M9 | ... | M15 |
|---|---|---|---|---|---|---|---|---|---|---|---|---|---|
| Lane0 | $D_{65}$ | $D_{69}$ | $D_{73}$ | $D_{77}$ | $D_{81}$ | $D_{85}$ | $D_{89}$ | $D_{93}$ | $D_{97}$ | $D_{101}$ | $D_{105}$ | ... | $D_{125}$ |
| Lane1 | $D_{66}$ | $D_{70}$ | $D_{74}$ | $D_{78}$ | $D_{82}$ | $D_{86}$ | $D_{90}$ | $D_{94}$ | $D_{98}$ | $D_{102}$ | $D_{106}$ | ... | $D_{126}$ |
| Lane2 | $D_{67}$ | $D_{71}$ | $D_{75}$ | $D_{79}$ | $D_{83}$ | $D_{87}$ | $D_{91}$ | $D_{95}$ | $D_{99}$ | $D_{103}$ | $D_{107}$ | ... | $D_{127}$ |
| Lane3 | $D_{68}$ | $D_{72}$ | $D_{76}$ | $D_{80}$ | $D_{84}$ | $D_{88}$ | $D_{92}$ | $D_{96}$ | $D_{100}$ | $D_{104}$ | $D_{108}$ | ... | $D_{128}$ |

FIGURE 25

Burst 3

| Ctrl | C0 | C1 | ... | C7 | C8 | M203 | M204 | ... | M212 | M213 | |A| |
|---|---|---|---|---|---|---|---|---|---|---|---|
| Lane0 | $D_{129}$ | $D_{133}$ | ... | $D_{153}$ | $D_{157}$ | $D_{161}$ | $D_{165}$ | ... | $D_{197}$ | $D_{201}$ | |A| |
| Lane1 | $D_{130}$ | $D_{134}$ | ... | $D_{154}$ | $D_{158}$ | $D_{162}$ | $D_{166}$ | ... | $D_{198}$ | $D_{202}$ | |A| |
| Lane2 | $D_{131}$ | $D_{135}$ | ... | $D_{155}$ | $D_{159}$ | $D_{163}$ | $D_{167}$ | ... | $D_{199}$ | ||| | |A| |
| Lane3 | $D_{132}$ | $D_{136}$ | ... | $D_{156}$ | $D_{160}$ | $D_{164}$ | $D_{168}$ | ... | $D_{200}$ | ||| | |A| |

FIGURE 26

Burst 4

| Ctrl | C₀ | C₁ | C₂ | C₃ | C₄ | C₅ | C₆ | C₇ | C₈ | M₂₁₄ | EOM | ||| | ||| |
|---|---|---|---|---|---|---|---|---|---|---|---|---|---|
| Lane0 | D₁ | D₅ | D₉ | D₁₃ | D₁₇ | D₂₁ | D₂₅ | D₂₉ | D₃₃ | D₃₇ | D₄₁ | ... | D₆₁ |
| Lane1 | D₂ | D₆ | D₁₀ | D₁₄ | D₁₈ | D₂₂ | D₂₆ | D₃₀ | D₃₄ | D₃₈ | D₄₂ | ... | D₆₂ |
| Lane2 | D₃ | D₇ | D₁₁ | D₁₅ | D₁₉ | D₂₃ | D₂₇ | D₃₁ | D₃₅ | D₃₉ | D₄₃ | ... | D₆₃ |
| Lane3 | D₄ | D₈ | D₁₂ | D₁₆ | D₂₀ | D₂₄ | D₂₈ | D₃₂ | D₃₆ | D₄₀ | D₄₄ | ... | D₆₄ |

FIGURE 27

| Burst 1 | | | | | | | | |
|---|---|---|---|---|---|---|---|---|
| Ctrl | SOF | $C_1$ | $C_2$ | $C_3$ | |A| | SOM | $M_1$ | ... | $M_{10}$ |
| Lane0 | = | = | = | = | |A| | = | = | ... | = |
| Lane1 | = | = | = | = | |A| | = | = | ... | = |
| Lane2 | = | = | = | = | |A| | = | = | ... | = |
| Lane3 | = | = | = | = | |A| | = | = | ... | = |

| Burst 2 | | | | | | | | |
|---|---|---|---|---|---|---|---|---|
| Ctrl | SOF | $C_1$ | $C_2$ | $C_3$ | |A| | $M_{11}$ | $M_{12}$ | ... | $M_{21}$ |
| Lane0 | = | = | = | = | |A| | = | = | ... | = |
| Lane1 | = | = | = | = | |A| | = | = | ... | = |
| Lane2 | = | = | = | = | |A| | = | = | ... | = |
| Lane3 | = | = | = | = | |A| | = | = | ... | = |

FIGURE 28

| Ctrl | C0 | C1 | C2 | C3 | C4 | C5 | C6 | C7 | C8 | M214 | EOM | SOM | ... | M7 |
|---|---|---|---|---|---|---|---|---|---|---|---|---|---|---|
| Lane0 | D1 | D5 | D9 | D13 | D17 | D21 | D25 | D29 | D33 | D37 | D41 | D45 | ... | D61 |
| Lane1 | D2 | D6 | D10 | D14 | D18 | D22 | D26 | D30 | D34 | D38 | D42 | D46 | ... | D62 |
| Lane2 | D3 | D7 | D11 | D15 | D19 | D23 | D27 | D31 | D35 | D39 | D43 | D47 | ... | D63 |
| Lane3 | D4 | D8 | D12 | D16 | D20 | D24 | D28 | D32 | D36 | D40 | D44 | D48 | ... | D64 |

FIGURE 29

METHOD OF AND SYSTEM FOR TRANSFERRING OVERHEAD DATA OVER A SERIAL INTERFACE

FIELD OF THE INVENTION

This invention relates to the field of serial interfaces for interconnecting and communicating data between senders and receivers of the data, and, more specifically, to techniques for transferring overhead data over such interfaces.

RELATED ART

In many applications, it is often desirable to be able to process a data unit in both parallel and serial modes of operation. In the parallel mode, the number of parallel data paths for transferring the data unit between a sender and receiver is equal to or greater than the width of the data unit, whereas, in the serial mode, the number of parallel data paths for transferring the data unit between a sender and receiver is less than the width of the data unit, causing different parts of the same data unit to be transferred serially over one or more of the same data paths.

In packet switching, for example, upon ingress of a packet into a network switch, it is often desirable to perform certain packet processing tasks, such as initial packet classification, in the parallel mode of operation particularly if these processing tasks must be performed at line speed. During the performance of these initial processing tasks, the packet is often transferred from a sender to a receiver within the ingress portion of the network switch over a parallel interface, i.e., where the number of data paths in the interface is equal to the width of a basic data unit.

In certain packet switching architectures, however, the egress portion of the network switch may be separated from the ingress portion by a backplane connection, i.e., an often lengthy (and noisy) connection between distinct ingress and egress portions of a switch over a backplane. As the cost of implementing the backplane connection as a parallel interface is often prohibitive due to the large number of data paths, as the single ended data paths typically present in parallel interfaces are susceptible to noise, and as the differential mode data paths typically present in serial interfaces offer better noise immunity than single ended data paths, the backplane connection is usually implemented as a serial interface, requiring that the initial egress-side packet processing tasks be performed in a serial mode of operation.

To maintain the same data throughput as the parallel interface, the individual data paths in the serial interface must be clocked at a higher rate than the data paths in the parallel interface. In FIG. 1 for example, illustrating a system 100 in which a sender 102 transfers data to receiver 104 over a parallel interface 106 comprising n parallel data paths, where n is an integer equal to the width of a data unit in bits, assuming each of the data paths have a data throughput of T bits/second, the overall throughput of the parallel interface is n×T. However, in FIG. 2, illustrating a system 200 in which sender 202 transfers data to receiver 204 over serial interface 206 comprising m data paths, where m is an integer less than the data width n, each of the data paths must be clocked at the rate of (n/m)×T to maintain the same throughput as the parallel interface of FIG. 1. Since n is greater than m, T', the rate at which the individual data paths are clocked in the serial interface, is greater than T by the factor n/m.

The rate at which the individual data paths are clocked, T', is also determinative of the number of parallel data paths, m, required in the serial interface. Mathematically, the number of required data paths is given by the expression n×(T/T'). Thus, the greater the value of T', the fewer the required number of data paths in the serial interface.

In certain applications, such as the previously mentioned packet switching architecture in which packets are transferred between ingress and egress portions of a network switch over a backplane connection implemented as a serial interface, it is often desirable to reduce the number of required data paths to a minimum by clocking the individual data paths at the maximum rate possible.

A complicating factor in these applications is that the serial interface must often accommodate additional data and information besides the packet data entering the ingress portion of the switch at line rate. FIG. 3, for example, illustrates a network switch 300 having one or more ingress portions 302a, 302b, 302c interconnected with one or more egress portions 304a, 304b, 304c through one or more backplane connections 308 implemented as a bi-directional serial interface having a forward portion 308a and a reverse portion 308b. For purposes of clarity, only the backplane connection/serial interface between ingress portion 302a and egress portion 304a is shown, but it should be appreciated that similar backplane connections/serial interfaces may be present between any of the ingress portions 302a, 302b, 302c and any of the egress portions 304a, 304b, 304c. Similarly, for ease of illustration, the forward and reverse portions of the serial interface 308a, 308b are shown as having the same number of data paths, m, but it should be appreciated that the number of data paths in these portions can be different.

The packet data from the network 310 enters the switch over a bi-directional parallel interface 326 having a forward portion 312a and a reverse portion 312b. Again, for purposes of clarity, the bi-directional interface 326 is shown as being symmetrical, with n data paths in both directions, but it should be appreciated that the interface could be asymmetrical, with different numbers of data paths in both directions. Similarly, for each of illustration, only ingress portion 302a is shown as being interconnected with network 310 through a parallel interface, but it should be appreciated that any of the ingress portions 302a, 302b, 302c may be interconnected with the network 310 in this manner.

The packet data entering the network switch over the forward portion 312a of the parallel interface 326 has a size P. But, as this packet data traverses the ingress portion 302a of the switch, it is augmented with three data items. The first is packet classification data generated by logic 323 and added to an incoming packet by adder 324. The second is mirrored packet data added to the incoming packet data by adder 318, and representing potentially-problematic packets flagged within the egress portion 304a of the switch as warranting further scrutiny by a network administrator. Logic 316 detects those packets that have been flagged, and routes mirrors (copies) of those packets to adder 318 so that the ingress portion 302a of the switch may direct them to a special port (not shown) where they may be accessed by a network administrator. (As with any packet, the originals of these packets enter the network 310 through the reverse portion 312b of the parallel interface 326.) The third is flow control commands and buffer status that the ingress portion 302a sends to the egress portion 304a to control the return flow of data and information over the reverse portion 308b of the serial interface 306.

A problem thus arises in accommodating this additional data while maintaining parity with the throughput of the parallel interface 326, because the rate at which the individual data paths of the forward portion 308a of the serial interface 306 are clocked cannot often be further increased beyond that already implemented to accommodate the reduction in data paths between the parallel and serial interfaces. Similarly, because of cost and noise susceptibility concerns, it is often impractical to increase the number of data paths, m, to accommodate the additional data.

SUMMARY

The invention provides a method of transferring overhead data from a sender to a receiver over a serial interface in which payload is also transferred from the sender to the receiver over the interface at a particular throughput. In this method, the overhead data is transferred from the sender to the receiver over one or more data paths of the interface during one or more time periods in which the transfer of the overhead data does not substantially impede the throughput of the payload transfer. For example, in a serial interface having distinct one or more payload and one or more control data paths, where the payload is transferred over the one or more payload data paths, and the control data is transferred over the one or more control paths, the overhead data (such as flow control information, or traffic data having lower priority than the payload) may be transferred over the one or more control paths during time periods in which these one or more control paths are not occupied by control data, i.e., data attributable to functions associated with transporting the payload from the sender to the receiver.

The invention also provides a serial interface that has one or more data paths for transferring payload from a sender to a receiver. In this serial interface, logic transfers overhead data from the sender to the receiver over one or more of the data paths during one or more time periods when excess bandwidth is available in these one or more data paths. In one example, where the sender is the ingress portion of a network switch and the receiver is the egress portion of the network switch, the serial interface is a backplane connection in the network switch interconnecting the ingress and egress portions.

The invention further provides a system having a sender, a receiver, and a serial interface having one or more payload paths for transferring payload from the sender to the receiver, where the payload transfer has a particular throughput, and one or more control paths for transferring control data from the sender to the receiver. In this system, a means is provided for transferring overhead data from the sender to the receiver over the one or more control paths during one or more time periods in which the overhead data may be transferred without substantially impeding the throughput of the payload transfer. In one example, the system is implemented as one or more ASICs in a network switch.

Other systems, interfaces, products, devices, methods, features and advantages of the invention will be or will become apparent to one with skill in the art upon examination of the following figures and detailed description. It is intended that all such additional systems, interfaces, products, devices, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 7 is a block diagram of an embodiment of a serial interface, characterized by distinct payload and control/overhead paths.

FIG. 8 is a timing diagram illustrating an example of concurrent transfer of payload and overhead data over a serial interface.

FIG. 9 illustrates an embodiment of a bi-directional serial interface.

FIG. 10 illustrates an example of flow control information that conveys FIFO buffer status of the intended recipient.

FIG. 18 illustrates an example format of a multi-port buffer status data word in the implementation example of FIG. 17.

FIG. 19 illustrates possible individual port buffer status values in the implementation example of FIG. 17.

FIG. 20 illustrates two programmable values used in setting the number of credits in individual port credit pools responsive to the individual buffer status values identified in FIG. 19.

FIG. 21 illustrates the concurrent transfer of FIFO buffer status data and a payload data burst in the implementation example of FIG. 17.

FIGS. 22A-22C illustrates the format of combined FIFO buffer status data and control data in the concurrent transfer of FIG. 21.

FIG. 23 illustrates the transfer of FIFO buffer status data that is independent of payload data transfer in the implementation example of FIG. 17.

FIGS. 24A-24B illustrates the format of the FIFO buffer status data in the independent transfer of FIG. 23.

FIGS. 25-29 illustrate various examples of the transfer of mirrored packet data in the interface switch implementation illustrated in FIG. 17.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% should be considered to be explicitly within the scope of the stated value.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

The term "logic" refers to implementations in hardware, software, or combinations of hardware and software.

The term "control data" refers to data directly attributable to functions associated with transporting payload from the sender to the receiver.

The term "overhead data" refers to any data sent from a sender to a receiver other than control data or payload. It includes data (such as flow control data) transferred from a sender to a receiver over a forward link that is attributable to functions associated with transporting payload from the receiver to the sender over a reverse link. It also includes traffic data (such as mirrored packet data) that is lower priority than the payload.

The term "ASIC" refers to an application specific integrated circuit.

Figure 1:
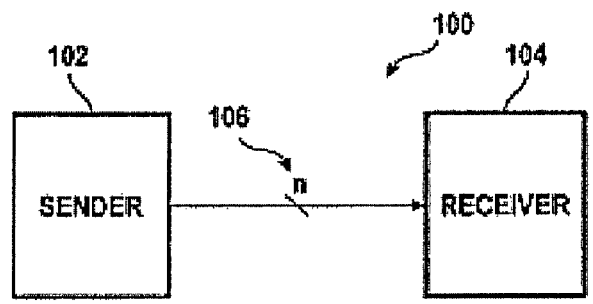
FIG. 1 is a block diagram illustrating a parallel interface between a sender and a receiver.
Figure 2:
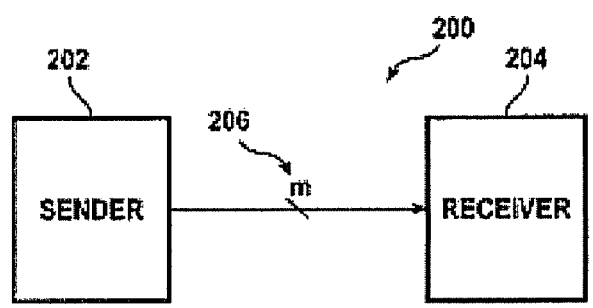
FIG. 2 is a block diagram illustrating a serial interface between a sender and a receiver.
Figure 3:
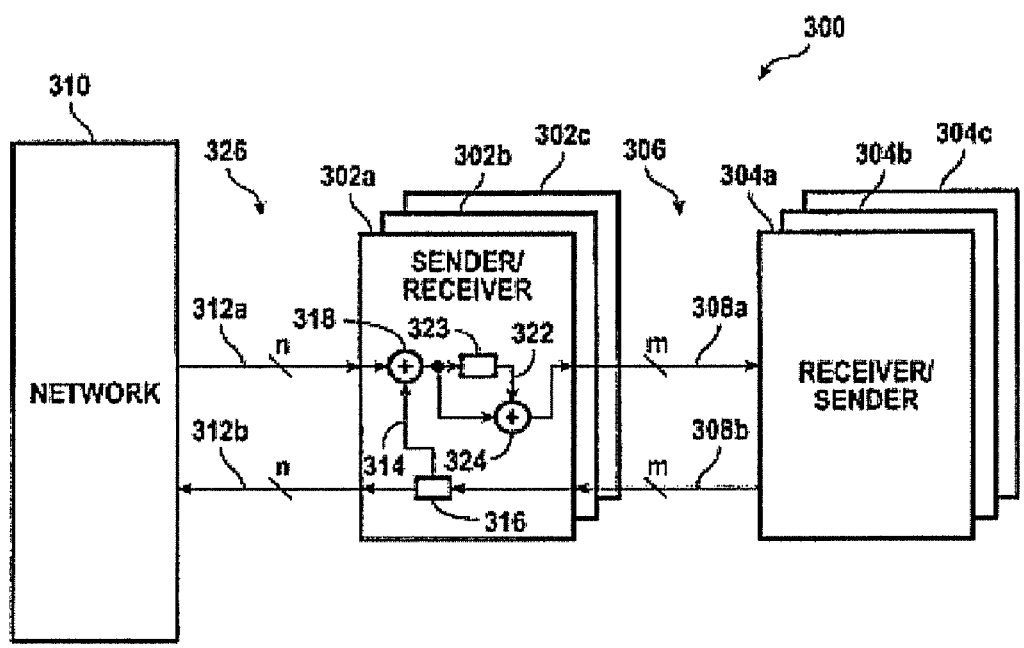
FIG. 3 illustrates a particular network switch architecture in which both parallel and serial interfaces are present.
Figure 4:
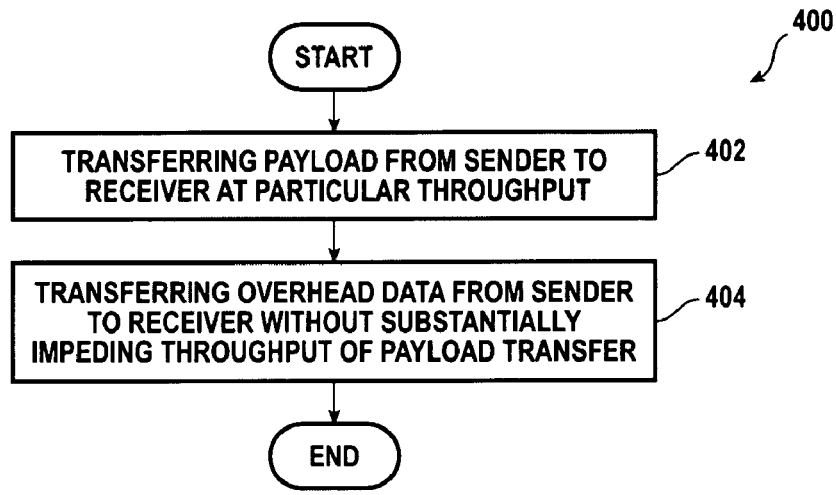
FIG. 4 is a flowchart of an embodiment of a method of transferring overhead data over a serial interface, characterized in that the transfer of the overhead data does not substantially impede the throughput of payload data transfer over the interface.

FIG. 4 illustrates an embodiment 400 of a method of transferring overhead data from a sender to a receiver over a serial interface that comprises steps 402 and 404. In step 402, payload is transferred from the sender to the receiver over the interface, the payload transfer having a throughput. In step 404, overhead data is transferred from the sender to the receiver over one or more data paths of the interface during one or more time periods in which the overhead data may be transferred over the one or more data paths without substantially impeding the throughput of the payload transfer.

Figure 5:
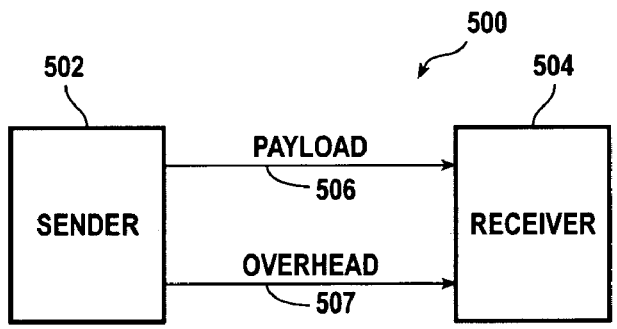
FIG. 5 is a block diagram of an embodiment of a serial interface, characterized by distinct payload and overhead data paths.

In one implementation of this embodiment, the overhead data is transferred concurrently with the payload. Referring to FIG. 5, concurrent transfer of the payload and overhead data may be performed in an embodiment 500 of a serial interface between sender 502 and receiver 504 in which one or more data lines 506 are provided for the transfer of the payload and one or more distinct, parallel data lines 507 are provided for the transfer of the overhead data.

Figure 6:
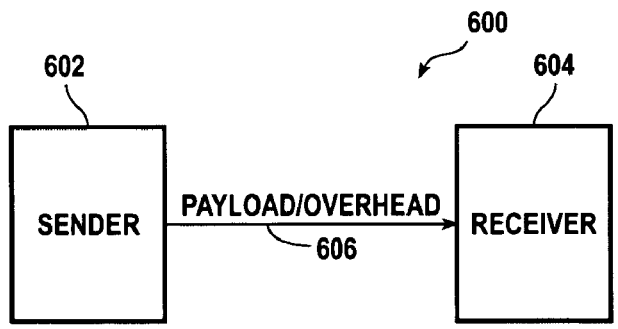
FIG. 6 is a block diagram of an embodiment of a serial interface, characterized by shared payload and overhead data paths.

In a second implementation, the overhead data is transferred independently of or unaccompanied by the payload. Referring to FIG. 6, independent transfer of the payload and overhead data may be performed in an embodiment 600 of a serial interface between sender 602 and receiver 604 in which both the payload and the overhead data are transferred over the same one or more data lines 606 during non-overlapping time periods.

In a third implementation, overhead data may be transferred in either of two modes. In the first mode, which may be referred to as the piggybacking mode, it is transferred concurrently with the transfer of payload while in the second mode, which may be referred to as the idle mode, it is transferred independently of the transfer of payload. Referring to FIG. 7, such dual mode operation may be performed in an embodiment 700 of a serial interface between sender 702 and receiver 704 in which one or more data paths 706 are provided for the transfer of payload and one or more distinct, parallel data paths 708 are provided for the transfer of control and overhead data in non-overlapping time periods. Referring to FIG. 8, in the first mode of operation, assuming the control data 802 that accompanies a payload 804 has a shorter duration than the payload, the overhead data 806 may be transferred over the one or more data lines 708 concurrently with the transfer of the payload after the transmission of the control data 802 has been completed. In the second mode of operation, the overhead data is transferred over the one or more data lines 708 while the one or more data lines 706 are idle.

Turning back to FIG. 4, in one example, the overhead data is flow control information for controlling a reverse flow of data from the receiver to the sender. In this particular example, referring to FIG. 9, it is assumed that the serial interface 900 between the sender 902 and receiver 904 is bi-directional, meaning that the interface provides one or more data paths 906 for transferring data from sender 902 to receiver 904, and one or more distinct, parallel data paths 908 for transferring data from receiver 904 to sender 902. The one or more data paths 906 may be referred to as the forward link and the one or more data paths 908 may be referred to as the reverse link. In this example, the overhead data transferred over the forward link 906 comprises flow control information for controlling the flow of data over the reverse link 908. Similarly, the overhead data transferred over the reverse link 908 comprises flow control information for controlling the flow of data over the forward link 906.

In one configuration, the flow control information is a 2-bit datum that relays the status of the status sender's FIFO buffer. Referring to FIG. 10, a value of '00' signals a STARVING condition, indicating that the status sender's FIFO buffer is almost empty; a value of '01' signals a HUNGRY condition, indicating that the status sender's FIFO buffer is partially empty; a value of '10' signals a SATISFIED condition, indicating that the status sender's FIFO buffer is almost full; and a value of '11' signals a FULL condition, indicating that the status sender's FIFO buffer is full.

The status recipient maintains a pool of credits that is exhausted as it transfers data to the status sender. In one example, each credit in the credit pool represents a 64 byte data burst. Thus, for each 64 bytes data burst sent by the status recipient to the status sender, the credit pool is decremented by one. When the credit pool reaches 0, the status recipient does not transmit any more data to the status recipient. Instead, the status recipient only transmits data to the status sender when the number of credits in the credit pool is a positive number.

In response to the signaling of a STARVING condition, the status recipient sets the number of credits in the credit pool to a maximum level, a value that is programmable. In response to the signaling of a HUNGRY condition, the status recipient set the number of credits in the credit pool to a minimum level, a value that is also programmable, assuming the existing number of credits is less. If the existing number of credits is more than the minimum level, the number of credits in the credit pool is left unchanged. In response to the signaling of a SATISFIED condition, the status recipient leaves the number of credits in the credit pool unchanged. In response to the signaling of a FULL condition, the status recipient cancels all remaining credits in the credit pool by resetting the number of credits to 0.

Figure 11:
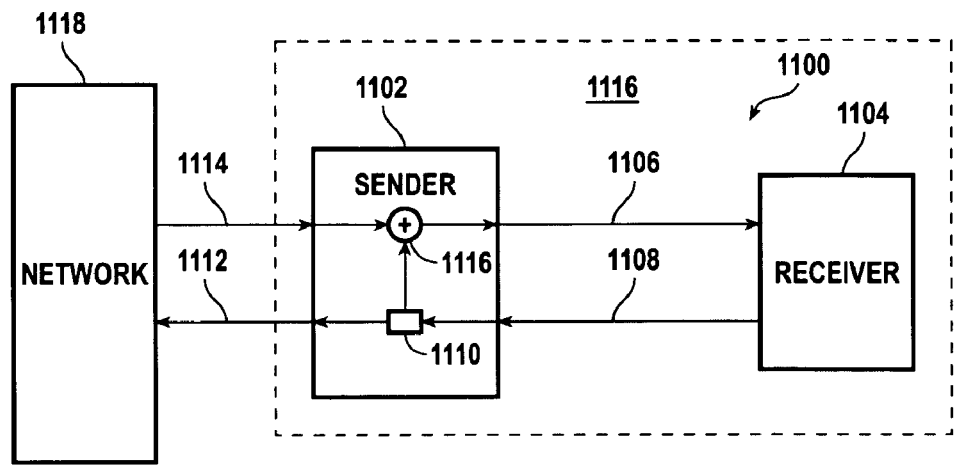
FIG. 11 illustrates an embodiment of a network switch in which data is transferred between ingress and egress portions of the switch over a serial interface, including overhead data in the form of mirrored packet data.

In a second configuration, the overhead data is data having a lower priority than the payload. In one implementation, the lower priority data is mirrored packet data. Referring to FIG. 11, it is assumed in this particular implementation that the sender 1102 and receiver 1104 are part of a network switch 1116, with the sender 1102 forming the ingress portion of the network switch 1116, and the receiver 1104 forming the egress portion of the network switch. It is further assumed in this implementation that a backplane connection interconnects the ingress portion 1102 and egress portion 1104 of the switch, and that this backplane interconnection is implemented as bi-directional serial interface 1100 comprising a forward link 1106 and a reverse link 1108.

Packets from network 1118 provided to the ingress portion 1102 of the switch over link 1114, where they are classified and then transferred to egress portion 1104 over the forward link 1106 of the backplane connection. The packet is further processed in the egress portion 1104. Through this processing, if it is determined the packet is of questionable validity such that further scrutiny by a network administrator is warranted, the flagged is flagged or marked, and the flagged packet returned to the ingress portion 1102 over reverse link 1108. Within ingress portion 1102, logic 1110 detects if the packet has been flagged or not. If so, a mirror (copy) of the packet is added back to the incoming data stream through adder 1116, and the original sent to the network 1118 over link 1112. The mirrored packet is then routed to a special port where it can be evaluated by a network administrator. If not, the original is sent to the network 1118 over link 1112 without being mirrored to the incoming data stream.

Figure 12:
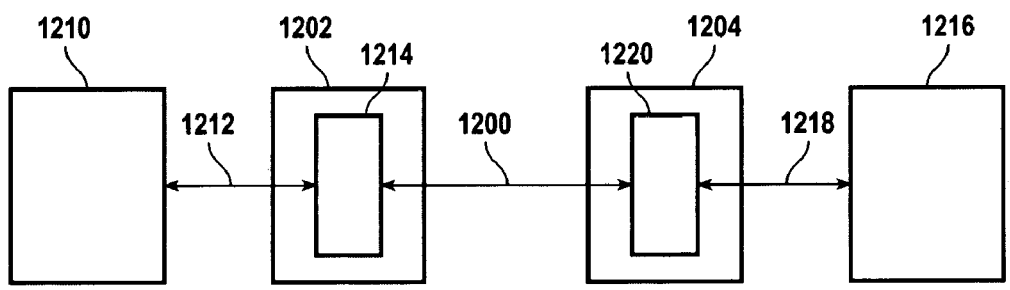
FIG. 12 illustrates an embodiment of a bi-directional serial interface interconnecting a sender and receiver that each includes or comprise a serdes.

In one embodiment, the sender and receiver each include a serdes. FIG. 12 illustrates a sender 1202 coupled to a receiver 1204 through a bi-directional serial interface 1200, where the sender 1202 includes serdes 1214 and the receiver 1204 includes serdes 1220. The sender 1202 receives data units in parallel from logic 1210 over parallel interface 1212, serializes these data units through serdes 1214, and then transfers these serialized data units to receiver 1204 through serial interface 1200. Serdes 1220 within receiver 1204 de-serializes these data units and then transfers the de-serialized data units to logic 1216 through parallel interface 1218.

In the reverse direction, the receiver 1204 receives data units in parallel from logic 1216 over parallel interface 1218, serializes these data units through serdes 1220, and then transfers these serialized data units to sender 1202 through serial interface 1200. Serdes 1214 within sender 1202 de-serializes these data units and then transfers the de-serialized data units to logic 1201 through parallel interface 1210.

Figure 13:
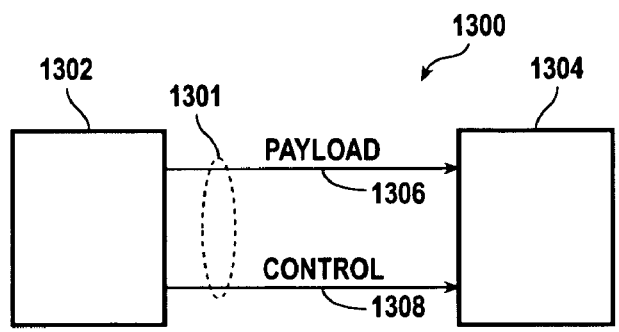
FIG. 13 illustrates an embodiment of a serial interface having distinct payload and control data paths.

FIG. 13 illustrates an embodiment 1300 of a serial interface having one or more data paths 1301 for transferring data between a sender 1302 and a receiver 1304. In this embodiment, the one or more data paths 1301 comprise one or more payload paths 1306 for transferring payload between the sender 1302 and the receiver 1304 and one or more control paths 1308 for transferring control data between the sender and the receiver.

Figure 14:
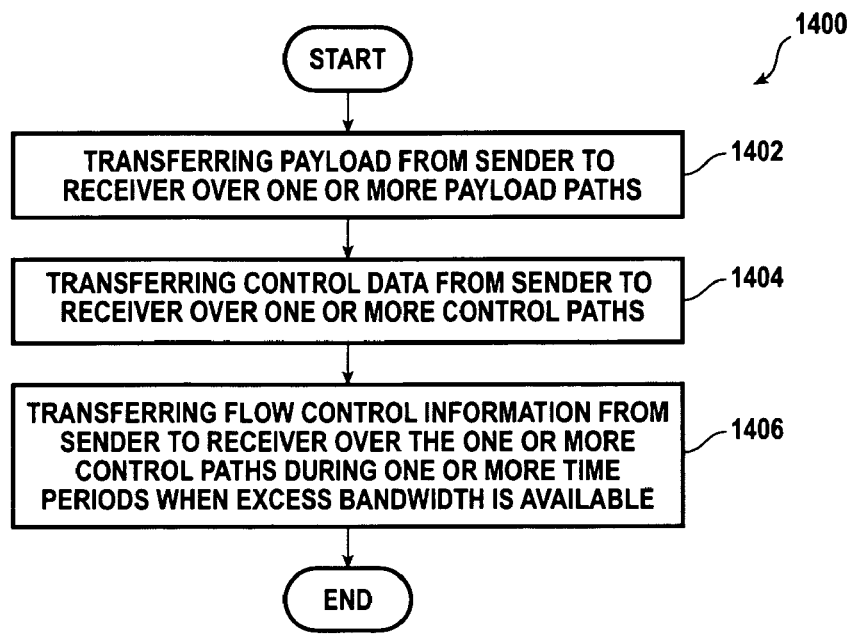
FIG. 14 is a flowchart of an embodiment of a method of transferring data over a serial interface, characterized in that overhead data is transferred over one or more control paths when excess bandwidth is available.

FIG. 14 is a flowchart of an embodiment 1400 of a method of transferring overhead data from the sender 1302 to the receiver 1304 over the serial interface of FIG. 13. In this embodiment, the method comprises three steps, identified with numerals 1402, 1404, and 1406.

Step 1402 comprises transferring payload from the sender 1302 to the receiver 1304 over the one or more payload paths 1306. Step 1404 comprises transferring control data 1308 from the sender 1302 to the receiver 1304 over the one or more control paths 1308. Step 1406 comprises transferring flow control information from the sender 1302 to the receiver 1304 over the one or more control paths 1308 during one or more time periods when excess bandwidth is available on the one or more control paths 1308.

In one embodiment, the one or more control paths are normally used for the transfer of control data that accompanies and relates to the transfer of payload. In this embodiment, excess bandwidth is available on the one or more control paths for the transfer of overhead data when the one or more control paths are not being used to transfer control data than accompanies and relates to the transfer of payload.

In one implementation, the flow control information is for controlling a reverse flow of data from the receiver 1304 to the sender 1302. In one example, the flow control information has the format illustrated in FIG. 10 and previously described.

In one embodiment, the flow control information is transferred from the sender to the receiver during one or more consecutive time periods. In a second embodiment, it is transferred from the sender to the receiver during one or more non-consecutive time periods. In a third embodiment, the flow control information is transferred over the one or more control paths concurrently with the transfer of payload over the one or more payload paths. In a fourth embodiment, the flow control information is transferred over the one or more control paths independently of or unaccompanied by the transfer of payload over the one or more payload paths.

In one implementation, the method of FIG. 14 is performed within a network switch. In a second implementation, the sender is an ingress portion of the network switch while the receiver is an egress portion of the network switch. In a third implementation, the sender and receiver each comprises an ASIC.

Figure 15:
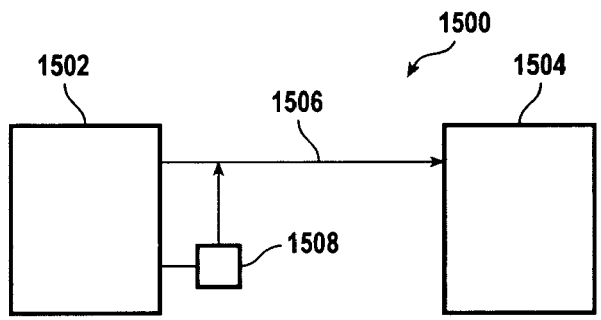
FIG. 15 is a block diagram of an embodiment of a serial interface, characterized by the inclusion of logic for transferring overhead data over one or more data paths when excess bandwidth is available.

FIG. 15 illustrates an embodiment of a serial interface 1500 comprising one or more data paths 1506 for transferring payload from a sender to a receiver and logic 1508 for transferring overhead data from the sender 1502 to the receiver 1504 over one or more of the data paths during one or more time periods when excess bandwidth is available in these one or more data paths. In this embodiment, excess bandwidth is available on the one or more data paths when the same are not being used to transfer payload or control data necessary for the transfer of the payload.

In one implementation, the logic 1508 comprises a multiplexor for multiplexing the overhead data onto the one or more data paths during the one or more time periods when excess bandwidth is available on these one or more data paths.

In one example, the overhead data is flow control information for controlling a reverse flow of data from the receiver 1504 to the sender 1502. In a second example, the overhead data is data having a lower priority than the payload. In a third example, the overhead data is lower priority data comprising mirrored packet data.

In one embodiment, the serial interface 1500 in combination with the sender 1502 and receiver 1504 forms a network switch. In one configuration, the serial interface 1500 forms a backplane connection between the sender 1502 and receiver 1504. In one implementation, the sender 1502 comprises an ingress portion of the network switch, and the receiver 1504 comprises an egress portion of the network switch.

Figure 16:
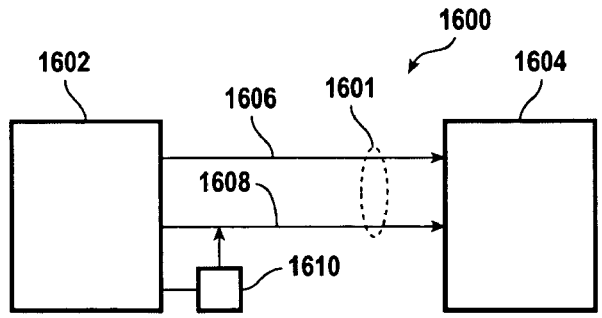
FIG. 16 is a block diagram of an embodiment of a serial interface, characterized by the inclusion of a means for transferring overhead data over one or more control paths without substantially impeding the throughput of payload data transfer.

FIG. 16 illustrates an embodiment 1600 of a system comprising a sender 1602, a receiver 1604, and a serial interface 1601 having one or more payload paths 1606 for transferring payload from the sender 1602 to the receiver 1604, the payload transfer having a throughput, and one or more control paths 1608 for transferring control data from the sender 1602 to the receiver 1604. In this embodiment, the system 1600 further comprises a means 1610 for transferring overhead data from the sender 1602 to the receiver 1604 over the one or more control paths 1608 during one or more time periods in which the overhead data may be transferred without substantially impeding the throughput of the payload transfer.

In one implementation, the means 1610 for transferring the overhead data is a multiplexor for multiplexing the overhead data onto the one or more control paths 1608 during one or more time periods when excess bandwidth is available in the one or more control paths. In this particular implementation, excess bandwidth is available on the one or more control paths 1608 when the same is not being used to transfer payload or control data necessary for the transfer of the payload.

In one example, the means 1610 for transferring is configured to transfer the overhead data from the sender 1602 to the receiver 1604 in one or more consecutive time periods. In a second example, the means 1610 for transferring is configured to transfer the overhead data from the sender 1602 to the receiver 1604 in one or more non-consecutive time periods.

In one configuration, the overhead data is flow control information for controlling a reverse flow of data from the receiver 1604 to the sender 1602. In a second configuration, the overhead data is traffic data having a lower priority than the payload. In a third configuration, the overhead data is lower priority traffic data comprising mirrored packet data that was at one time higher priority traffic data such as payload.

In one implementation, the system is embodied as a network switch. In one example, the sender 1602 is an ingress portion of the switch (implemented as one or more ASICs), the receiver 1604 is an egress portion of the switch (also implemented as one or more ASICs), and the serial interface 1601 is embodied as a backplane connection between the ingress and egress portions of the switch.

In one alternative, the system comprises a sender; a receiver; a serial interface having one or more data paths, the one or more data paths comprising one or more payload paths for transferring payload from the sender to the receiver, the payload transfer having a throughput; and means for transferring first data comprising overhead data, control data, or both from the sender to the receiver over one or more of the data paths during one or more time periods in which the data may be transferred without substantially impeding the throughput of the payload transfer. In this particular alternative, the control data, like the overhead data, may be transferred between the sender and receiver during periods of excess bandwidth on one or more of the data paths. In this particular, excess bandwidth is available on the one or more data paths when the same are not being used to transfer payload.

Detailed Example

Figure 17:
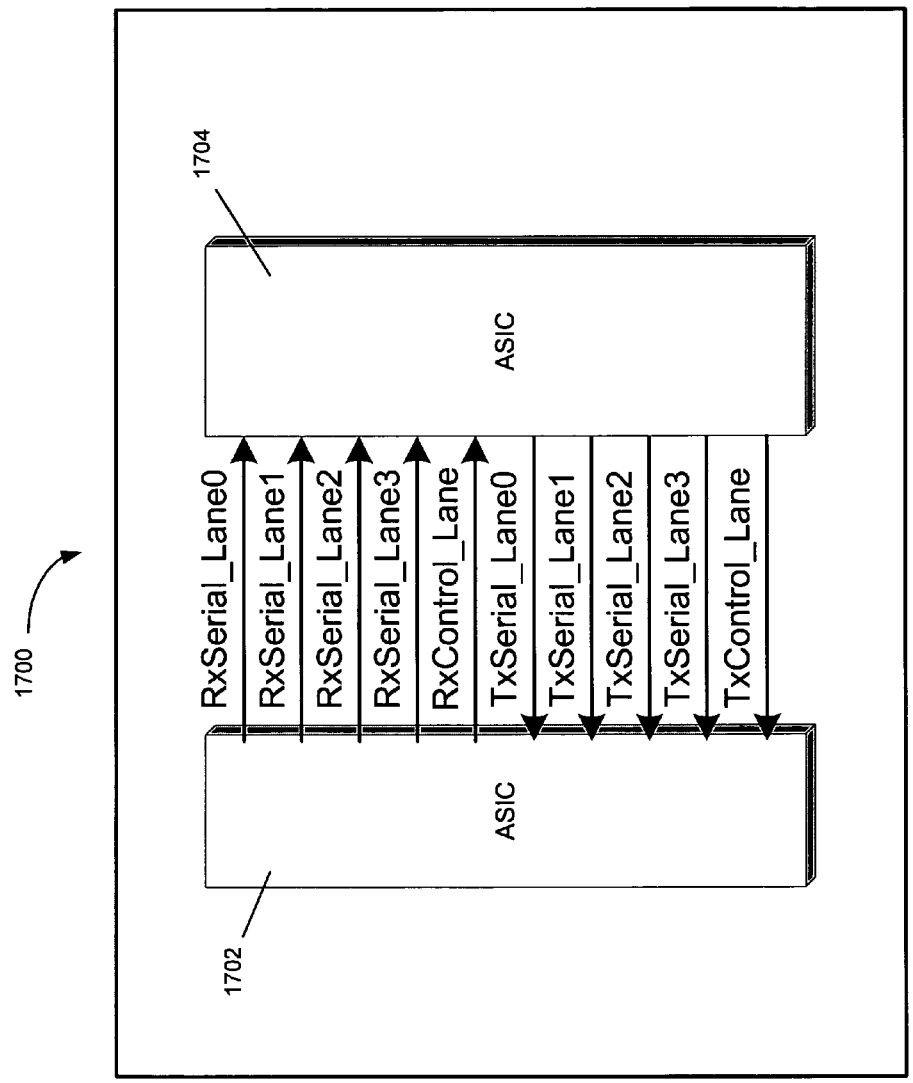
FIG. 17 is a block diagram of an implementation example of a bi-directional serial interface characterized by four payload data lanes and one control lane in both the forward and reverse directions.

Referring to FIG. 17, in one example, the serial interface 1700 provides for bi-directional data exchange between two field programmable gate array ASIC devices, comprising a transmitting device 1702 and a receiving device 1704. For transferring payload data from the transmitter 1702 to the receiver 1704, the interface 1700 provides 4 8-bit payload data lanes, identified in the figure as RxSerial_Lane0, RxSerial_Lane1, RxSerial_Lane2, and RxSerial_Lane3, for the transfer of payload data, and one 8-bit control data lane, RxControl_Lane, for the transfer of control data. For transmitting payload data from the receiver 1704 to the transmitter 1702, the interface 1700 provides 4 8-bit payload data lanes, identified as TxSerial_Lane0, TxSerial_Lane1, TxSerial_Lane2, and TxSerial_Lane3, for the transfer of payload data, and one 8-bit control data lane, TxControl_Lane, for the transfer of control data.

In this particular example, each of the payload data lanes has an available effective bandwidth of 2.5 GB/s, with the available actual bandwidth of 3.125 GB/s about 0.625 GB/s higher (such that the 0.625 GB/s increment represents about 20% of the actual available bandwidth of 3.125 GB/s) to account for certain encoding information, the details of which are not pertinent to this discussion. Together, the four payload data lanes in a particular direction, whether forward (transmitter to receiver) or reverse (receiver to transmitter) provide a possible throughput of 10 GB/s.

Each of the control data lanes similarly has an available bandwidth of 2.5 GB/s, although only about 0.62 GB/s of this bandwidth is needed to transfer the control data that accompanies the transfer of payload data. Hence, there is an available excess bandwidth of 1.88 GB/s (2.5 GB/s–0.62 GB/s) on each of these control lanes for the transfer of overhead data, such as flow control information or mirrored packet data.

The payload data in this example is transferred in the form of 64 byte bursts, except that, if the burst represents the last portion of a packet, it can be extended to a length of up to 127 bytes. As the 4 payload lanes allow 4 bytes to be transferred in parallel on each clock transition, 16 clock transitions are required to transfer a 64 byte burst. Assuming a DDR (double date rate) clock, where a data transfer occurs on both a rising and a falling edge, 8 clock cycles are required to transfer the 64 bytes burst.

Logically, the forward and reverse links are divided into ten ports, identified as port 0-port 9, and data may be transferred between the transmitter 1702 and receiver 1704 over any of the ten ports. A data source, whether the transmitter 1702 or receiver 1704, maintains a credit pool for each of the ten ports. When the credit pool for a port is empty (has a 0 value), the data source does not transmit over the port. When the credit pool has a positive number of credits, the data source continues to transmit over the port (while data is available) until the credit pool is exhausted (has a 0 value). For each 64 byte burst transmitted over a port, the data source decrements the credit pool by 1.

A data recipient, whether the transmitter 1702 or receiver 1704, maintains a FIFO buffer for each of the ports, and transfers flow control information to the data source for each of the ports, identifying the status of the recipient's corresponding FIFO buffer. The status is communicated to the data source in the form of a 20 bit data item having the format illustrated in FIG. 18. As indicated, 2 bits of status information are provided for each of the ten ports.

The status information for a port identifies one of four possible conditions that are illustrated in FIG. 19. The STARVING condition, corresponding to a value of '00', indicates that the port's FIFO buffer is almost empty. When received, the data source sets the number of credits in the corresponding credit pool to a programmable level (MaxBurst, illustrated in FIG. 20).

The HUNGRY condition, corresponding to a value of '01', indicates that the port's FIFO is partially empty. When received, the data source sets the number of credits in the corresponding credit pool to a programmable level (Mid-Burst, illustrated in FIG. 20) if the current level is less. If the current level is more, it is left unchanged.

The satisfied condition, corresponding to a value of '10', indicates that the port's FIFO is almost full. When received, the data source leaves the number of credits in the corresponding credit pool unchanged.

The full condition, corresponding to a value of '11', indicates that the port's FIFO is full. When received, the data source sets the number of credits in the corresponding credit pool to 0.

Referring to FIG. 21, in a piggybacking mode of operation, the FIFO status information that governs a reverse data flow is combined with control data relating to a forward flow to form 8 bytes of data, identified in the figure as $C_1$-$C_8$, which are transferred over a control lane concurrently with the transfer of a 64 byte burst of payload data, identified in the figure as $D_1$-$D_{64}$, which are transferred over the four payload data lanes as indicated. A special control byte, SOB, which is transferred on the control lane and is identified as $C_0$, signals the start of a 64 byte burst.

The format of the bytes $C_0$-$C_8$ that accompany the 64 byte burst on the control lane is illustrated in FIGS. 22A-22B. As illustrated, $C_0$ is the special byte, SOB, signaling the start of a burst; $C_1$-$C_5$ and the lower 4 bits of $C_8$ are control data, the precise constitution of which is not pertinent to this discussion, that should accompany the data burst; and $C_6$, $C_7$, and the upper 4 bits of $C_8$ comprise or include the 20 bit 10 port buffer status data (illustrated in FIG. 18).

Referring to FIG. 23, when the four payload data lanes are idle (a condition indicated by the notation [I]), the 20 bit 10 port buffer status data may be transferred over the control lane in three successive bytes, identified in the figure as $C_1$-$C_3$. These three bytes are preceded on the control lane by a special byte, SOF, signaling a start of flow condition. This special byte is also referred to as $C_0$. The three bytes $C_1$-$C_3$ have the format illustrated in FIGS. 24A-24B. As illustrated, the special SOF byte forms $C_0$; the 20 bit 10 port status data (illustrated in FIG. 18) forms $C_1$-$C_2$ and the upper 4 bits of $C_3$; and the lower 4 bits of $C_3$ (whose precise constitution is not pertinent to this discussion) relate to the manner in which the 20 bit 10 port status data is encoded.

As demonstrated by the foregoing, in this example, the status information may be transferred over the control lane, either concurrently with or independently of the transfer of payload data over the 4 payload data lanes, whenever excess bandwidth is available on the control lane, i.e., bandwidth that is not needed for the transfer of control data over the control lane.

As the status information in this example must be transferred periodically between the sender and receiver, e.g., every 16 clock cycles, the available excess bandwidth should be sufficient to transfer the status information at the requisite rate even under worst-case conditions. In the present example, even assuming worst case conditions where payload is continuously or near continuously sent over the data paths in 127 byte bursts, the piggybacking mode of operation, where the status data is transferred concurrently with the transfer of the payload data, guarantees that the status information is transferred at the required rate.

The control lane may also be used in this example to transfer mirrored packet data during periods in which excess bandwidth is available on the control lane. Referring to FIG. 25, which illustrates two successive 64 byte payload data bursts, 15 bytes of mirrored data, referred to in the figure as $M_1$-$M_{15}$, are transferred over the control lane during non-consecutive time periods when the control lane is not occupied with the piggybacked transfer of two instances of the 9 bytes of overhead and flow control data, $C_0$-$C_8$ (illustrated in FIGS. 22A-22C). As shown, the mirrored data is preceded on the control lane by a special byte, SOM, signaling the start of the mirrored data.

FIG. 26 illustrates a 74 byte end of packet burst, referred to as $D_{129}$-$D_{200}$. In this particular example, 11 bytes of mirrored data, $M_{203}$-$M_{213}$, are transferred over the control lane during time periods in which the control lane is not occupied with the transfer of the 9 bytes, $C_0$-$C_8$, that accompanies the data burst. Note that this mirrored data is not preceded by a SOM byte as it is considered to be a continuation of the mirrored data of FIG. 25.

FIG. 27 illustrates the completion of a transfer of mirrored data in the middle of a 64 byte payload data burst transfer. As shown, the end of the mirrored data transfer is signaled with a special EOM (end of mirror) byte.

FIG. 28 illustrates a mixture of flow control bursts (the 4 bytes $C_0$-$C_3$ illustrated in FIGS. 24A-24B) and mirrored data being transferred over the control lane while the 4 payload data lanes are idle.

FIG. 29 illustrates the completion of a transfer of mirrored packet data (signaled by the EOM byte) followed by the immediate transfer of new mirrored packet data (signaled by the SOM byte) during the middle of a 64 payload data burst transfer.

While various embodiments of the invention have been described, it will be apparent to those of ordinary skill in the art that many more embodiments and implementations are possible that are within the scope of this invention.

What is claimed is:

1. A method, performed in, by or for a network switch, of transferring overhead data from a sender to a receiver over a serial interface comprising:

transferring payload from the sender to the receiver over the serial interface, the payload transfer having a throughput;

transferring control data from the sender to the receiver over a plurality of data paths of the serial interface, the control data comprising data directly attributable to transporting the payload from the sender to the receiver; and transferring overhead data from the sender to the receiver over the plurality of data paths of the serial interface, the overhead data comprising data that is neither payload nor directly attributable to transporting the payload from the sender to the receiver, wherein overhead data is transferred in either of two modes:

in a first mode the control data is transferred in a first time period and the overhead data is transferred in a second time period on a first data path of the plurality of data paths, and the payload is transferred concurrently on a second data path of the plurality of data paths during the first and the second time period, and in a second mode the overhead data is transferred over one of the plurality of data paths while the one of the plurality of data paths is idle, wherein the overhead data is transferred independently of the payload, wherein the overhead data comprises flow control data and mirrored packet data.

2. The method of claim 1, wherein the overhead data is the flow control data for controlling a reverse flow of data from the receiver to the sender.

3. The method of claim 1, wherein the overhead data is data having a lower priority than the payload.

4. The method of claim 3, wherein the lower priority data is mirrored data.

5. The method of claim 1, wherein the sender comprises an ingress portion of the network switch.

6. The method of claim 1, wherein the receiver comprises an egress portion of the network switch.

7. The method of claim 1, wherein the plurality of data paths are control data paths normally used for transferring the control data from the sender to the receiver.

8. The method of claim 1, wherein the sender is allotted an additional bandwidth based on a status of a credit pool related to a FIFO buffer of the sender.

9. A method, performed in, by or for a network switch, of transferring flow control data from a sender to a receiver over a serial interface, the serial interface having a plurality of data paths for transferring data from the sender to the receiver, the plurality of data paths comprising one or more payload paths for transferring payload from the sender to the receiver and one or more control paths for transferring control data from the sender to the receiver, the method comprising:

transferring payload from the sender to the receiver over the one or more payload paths;
  transferring control data from the sender to the receiver over the one or more control paths, the control data comprising data directly attributable to transporting the payload from the sender to the receiver; and
  transferring flow control data from the sender to the receiver over the one or more control paths, the flow control data for controlling a reverse flow of data from the receiver to the sender, wherein the flow control data is transferred in either of two modes:
  in a first mode the control data is transferred in a first time period and the flow control data is transferred in a second time period on a first data path of the plurality of data paths, and the payload is transferred concurrently on a second data path of the plurality of data paths during the first and second time period, and
  in a second mode the flow control data is transferred over one of the plurality of data paths while the one of the plurality of data paths is idle, wherein the flow control data is transferred independently of the payload.

10. The method of claim 9, wherein the flow control data is transferred from the sender to the receiver during one or more consecutive time periods.

11. The method of claim 9, wherein the flow control data is transferred from the sender to the receiver during one or more non-consecutive time periods.

12. The method of claim 9, wherein the sender and the receiver each comprise an ASIC.

13. In a network switch, a serial interface comprising:

a plurality of data paths for transferring payload, control data, or both from a sender to a receiver; and
  logic for transferring overhead data from the sender to the receiver over the plurality of data paths during one or more time periods when excess bandwidth is available in the one or more data paths,
  wherein the overhead data is transferred in either of two modes:
  in a first mode the control data is transferred in a first time period and the overhead data is transferred in a second time period on a first data path of the plurality of data paths, and the payload is transferred concurrently on a second data path of the plurality of data paths during the first and the second time period, and
  in a second mode the overhead data is transferred over one of the plurality of data paths while the one of the plurality of data paths is idle, wherein the overhead data is transferred independently of the payload,
  wherein the overhead data comprises flow control data and mirrored packet data.

14. The serial interface of claim 13, wherein the logic comprises a multiplexor for multiplexing the overhead data onto the plurality of data paths during the one or more time periods when excess bandwidth is available on the plurality of data paths.

15. The serial interface of claim 13, wherein the overhead data is flow control data for controlling a reverse flow of data from the receiver to the sender.

16. The serial interface of claim 13, wherein the overhead data is data having a lower priority than the payload.

17. The serial interface of claim 16, wherein the lower priority data is mirrored data.

18. The serial interface of claim 13 in combination with the sender and the receiver.

19. The serial interface of claim 13 further comprising a backplane connection between the sender and the receiver.

20. The serial interface of claim 19, wherein the sender comprises an ingress portion of the network switch.

21. The serial interface of claim 20, wherein the receiver comprises an egress portion of the network switch.

22. A system, in or associated with a network switch, comprising:

a sender;
  a receiver;
  a serial interface having a plurality of data paths, the plurality of data paths comprising one or more payload paths for transferring payload from the sender to the receiver, the payload transfer having a throughput; and
  means for transferring first data comprising overhead data, control data, or both from the sender to the receiver over the plurality of data paths during one or more time periods when excess bandwidth is available so that the data is transferred without substantially impeding the throughput of the payload transfer,
  wherein the overhead data is transferred in either of two modes:
  in a first mode the control data is transferred in a first time period and the overhead data is transferred in a second time period on a first data path of the plurality of data paths, and the payload is transferred concurrently on a second data path of the plurality of data paths during the first and the second time period, and
  in a second mode the overhead data is transferred over one of the plurality of data paths while the one of the plurality of data paths is idle, wherein the overhead data is transferred independently of the payload,
  wherein the overhead data comprises flow control data and mirrored packet data.

23. The system of claim 22, wherein the plurality of data paths further comprises one or more control paths, the first data comprises overhead data, and the means for transferring is a multiplexor for multiplexing the overhead data onto the one or more control paths during one or more time periods when excess bandwidth is available in the one or more control paths.

24. The system of claim 22, wherein said means for transferring is configured to transfer the first data from the sender to the receiver in one or more consecutive time periods.

25. The system of claim 22, wherein said means for transferring is configured to transfer the first data from the sender to the receiver in one or more non-consecutive time periods.

26. The system of claim 22, wherein the first data is flow control information for controlling a reverse flow of data from the receiver to the sender.

27. The system of claim 22, wherein the first data is data having a lower priority than the payload.

28. The system of claim 27, wherein the lower priority data is mirrored data.

* * * * *